(12) United States Patent
Healy

(10) Patent No.: US 9,364,019 B2
(45) Date of Patent: Jun. 14, 2016

(54) CORING APPARATUS

(71) Applicant: Daniel P. Healy, Louisville, KY (US)

(72) Inventor: Daniel P. Healy, Louisville, KY (US)

( * ) Notice: Subject to any disclaimer, the term of this patent is extended or adjusted under 35 U.S.C. 154(b) by 0 days.

(21) Appl. No.: 13/750,609

(22) Filed: Jan. 25, 2013

(65) Prior Publication Data

US 2014/0212555 A1    Jul. 31, 2014

(51) Int. Cl.
*A23N 7/08* (2006.01)
*A23N 4/12* (2006.01)
*A23N 4/20* (2006.01)
*A47J 25/00* (2006.01)

(52) U.S. Cl.
CPC .. *A23N 4/12* (2013.01); *A23N 4/20* (2013.01); *A47J 25/00* (2013.01)

(58) Field of Classification Search
CPC .............. A23N 4/12; A23N 4/20; A47J 25/00
USPC ........... 99/568–583, 600, 538–539, 584, 617, 99/618, 547, 552, 541–545, 549, 550, 99/559–561, 564, 565, 588, 593; 30/120.1–120.2
See application file for complete search history.

(56) References Cited

U.S. PATENT DOCUMENTS

| | | |
|---|---|---|
| 205,122 A | 6/1878 | Morrow |
| 419,722 A | 1/1890 | Siersdorfer |
| 1,146,085 A | 7/1915 | McVey |
| 1,631,854 A * | 6/1927 | Carroll ............................ 99/542 |
| 2,188,362 A | 1/1940 | Krilow |
| 3,128,810 A | 4/1964 | Whipp |
| 3,151,644 A | 10/1964 | Bainbridge et al. |
| 3,540,503 A | 11/1970 | McNair |
| 3,656,529 A | 4/1972 | Vadas |
| 3,700,017 A | 10/1972 | Vincent et al. |
| 3,780,641 A | 12/1973 | Hole |
| 3,806,620 A | 4/1974 | Vadas |
| 4,108,059 A | 8/1978 | Loveland |
| 4,252,056 A | 2/1981 | Altman |
| 4,373,432 A | 2/1983 | Tsutsumi |
| 4,441,413 A | 4/1984 | Mori |
| 4,490,912 A | 1/1985 | Hirano |
| 4,497,245 A | 2/1985 | Mori |
| 4,546,545 A | 10/1985 | Hirano |
| 4,606,263 A | 8/1986 | Ross et al. |
| 4,653,393 A | 3/1987 | Ross |
| 4,690,047 A | 9/1987 | Balzano |
| 4,718,333 A | 1/1988 | Pierce et al. |
| 4,741,265 A | 5/1988 | Cushman |

(Continued)

FOREIGN PATENT DOCUMENTS

| | | |
|---|---|---|
| EP | 0483930 | 5/1992 |
| GB | 509487 | 10/1937 |

(Continued)

*Primary Examiner* — Phuong Nguyen
(74) *Attorney, Agent, or Firm* — Middleton Reutlinger

(57) ABSTRACT

A coring apparatus and method for coring produce and/or forming a beverage container from produce including a rotatable cutting core or member. The coring apparatus allows linear translation and/or rotation of constituent members to facilitate insertion of a cutting member, separation of a core from produce, and/or removal of the core from produce. A carrier is used to translate a rotatable cutting core for insertion in and removal from produce. The rotatable cutting core is rotatable in relation to the carrier and may optionally include an additional cutting member disposed therein.

19 Claims, 7 Drawing Sheets

(56) References Cited

U.S. PATENT DOCUMENTS

| | | | |
|---|---|---|---|
| 4,834,795 A | 5/1989 | Raub et al. | |
| 4,985,268 A | 1/1991 | Bingham | |
| 5,067,397 A | 11/1991 | Healy | |
| 5,133,250 A | 7/1992 | Del Ser Gonzalez | |
| 5,142,972 A | 9/1992 | Sundquist | |
| 5,181,459 A * | 1/1993 | Camezon et al. | 99/546 |
| 5,231,921 A | 8/1993 | Kirk | |
| 5,245,919 A | 9/1993 | Neidigh | |
| 5,373,781 A | 12/1994 | Knasel | |
| 5,454,301 A | 10/1995 | Rainey et al. | |
| 5,463,943 A | 11/1995 | Knasel | |
| 5,640,898 A | 6/1997 | Tomelleri | |
| 5,787,801 A | 8/1998 | Kirk et al. | |
| 5,957,045 A | 9/1999 | He et al. | |
| 6,125,744 A | 10/2000 | Martin | |
| 6,148,719 A * | 11/2000 | Poltielov | 99/544 |
| 6,237,475 B1 | 5/2001 | Ascari et al. | |
| D464,537 S | 10/2002 | Healy | |
| 6,684,748 B2 | 2/2004 | Mendenhall | |
| 6,718,868 B2 | 4/2004 | Ismail et al. | |
| 7,096,777 B1 | 8/2006 | Healy | |
| D558,002 S | 12/2007 | Meyer | |
| 7,406,914 B1 * | 8/2008 | Healy | 99/542 |
| 2003/0039732 A1 | 2/2003 | Blasco Piquer et al. | |
| 2003/0121422 A1 | 7/2003 | Mendenhall | |
| 2011/0036249 A1 * | 2/2011 | Barrett | 99/544 |

FOREIGN PATENT DOCUMENTS

| | | |
|---|---|---|
| GB | 764717 | 1/1957 |
| GB | 1569019 | 6/1980 |
| WO | 02087364 | 11/2002 |

* cited by examiner

US 9,364,019 B2

CORING APPARATUS

FIELD OF INVENTION

The present invention is related generally to a food processing tool, and more specifically to a coring machine for removing a core from an edible plant part or produce, such as a fruit or vegetable.

DESCRIPTION OF RELATED ART

Various coring machines have been proposed in the art, some of which utilize a cylindrical, or tubular, blade. There is a need however, for a coring apparatus that easily and quickly removes a core from an edible plant part or produce, such as, for example, a fruit or vegetable. Existing machines often require intense manual labor to core a fruit or vegetable, because they do not provide a sufficient lever to aid in insertion of a blade, or they do not provide an effective aid for rotating a blade to separate the core, or both. There is also a need for a simple aid for rotating a coring apparatus blade that allows for easier, more cost effective, maintenance and enhances the versatility of the coring apparatus, for example, by allowing the coring apparatus to be base-mounted or wall-mounted without needing significant modification. There is also a need for a device that can consistently and reliably control the depth to which the fruit or vegetable is cored, thereby ensuring formation of a cup, or similar structure, from the fruit after coring.

Additionally, existing methods of coring are laborious. The force necessary for inserting a blade into an edible plant part, such as a fruit or vegetable, or the force necessary for coring the edible plant part, or both, are relatively high as the forces for insertion or for rotation, or both, are currently applied by hand often without the aid of a mechanical device, such as a lever. Thus, there is a need for a simple and effective method of coring an edible plant part.

SUMMARY OF THE INVENTION

The present disclosure is directed towards inventive apparatus and methods for coring produce. The coring apparatus is, in various embodiments, an apparatus comprising a cutting core that is rotatably held by a carrier to allow the cutting core to rotate relative to the carrier. The carrier and cutting core are able to slideably engage a stationary guide and thus translate in a translational direction. The cutting core has rigidly affixed thereto a radially outwardly extending handle.

Generally, in one aspect, a coring apparatus is provided for coring produce easily and efficiently. The coring apparatus includes a carrier that is slidingly positionable between a first and a second translational position. The coring apparatus also includes a cylindrical cutting core with a handle projecting therefrom, the cylindrical cutting core and the handle being rotatably connected to the carrier, so that the cylindrical cutting core and handle are rotatable relative to the carrier between a first and a second position in at least one of the first and second translational positions. In some embodiments, the cylindrical cutting core may include an inner cylindrical surface and an outer cylindrical surface, wherein a cutting member is disposed within the inner cylindrical surface. The handle may project outwardly from the outer cylindrical surface. The cutting member may include a cutting edge. The cutting member may be a plate with opposing planar surfaces facing perpendicular to the longitudinal axis of the cylindrical cutting core. The opposing planar surfaces of the cutting member and the inner cylindrical surface of the cylindrical cutting core may define at least two passages. The carrier may include a core bearing that rotatably connects the cylindrical cutting core and the handle to the carrier. The core bearing may include a first bearing and a second bearing disposed on opposing sides of the handle of the cutting core.

Generally, in another aspect, a coring apparatus for produce is provided. The coring apparatus includes a cutting core having a body with an inner surface, the inner surface including an upper end and a lower end, wherein the lower end includes a cutting plate within the inner surface of the cutting core. The coring apparatus also includes a carrier having a bearing, and at least an upper position and a lower position along a longitudinal axis of the cutting core while carrying the cutting core therebetween. The cutting core is rotatable between a first position and a second position relative to the bearing of the carrier about the longitudinal axis when the carrier is in the lower position. In some embodiments, the carrier may include an upper and lower cylindrical bearing receiving the cutting core. The cutting core may include a fixed handle that is rotatable between the upper and lower cylindrical bearings. The cutting core may include a fixed handle projecting radially outwardly from the body in a direction substantially perpendicular to the longitudinal axis. The cutting plate may include elongated planar surfaces between an upper edge and a lower edge of the cutting plate. The planar surfaces of the cutting plate may be cam surfaces during rotation of the cutting core between the first position and the second position. The coring apparatus may include an ejecting member wherein the carrier is translatable to a core ejecting position above the upper position and the ejecting member is received within the upper end of the cutting core inner surface when in the core ejecting position to remove the produce core.

Generally, in another aspect, a coring apparatus for produce is provided. The coring apparatus includes a base and an elongated member projecting from the base. The coring apparatus also includes a carrier that is slideably connected to the elongated member so that the carrier slides in a translational direction relative to the base along the length of the elongated member. The coring apparatus also includes a cylindrical cutting core that is rotatably connected to the carrier so that the cylindrical cutting core is correspondingly movable with the carrier in the translational direction. The cylindrical cutting core includes a handle radially extending outwardly therefrom. The coring apparatus also includes a cutting member coupled to the cylindrical cutting core and radially extending inwardly therefrom. In some embodiments, the cutting member may have a thickness perpendicular to the longitudinal axis of the cylindrical cutting core and a height parallel to the longitudinal axis that is greater than the thickness. The coring apparatus may also include a hand press, at least a portion of which forms a lever for increasing force applied to the carrier in the translational direction. The carrier and the cylindrical cutting core may be rotatably connected by at least one bearing. The coring apparatus may also include an ejection member extending from the elongated member and projecting into the cylindrical cutting core when in an engaged position and projects out of the cylindrical cutting core when in a disengaged position. The cylindrical cutting core may rotate about its longitudinal axis.

Generally, in another aspect, a method for forming a beverage container from produce is provided. The method includes providing a cylindrical cutting core and a carrier, translating the cylindrical cutting core and the carrier towards the produce in a translational direction, inserting the cylindrical cutting core into the produce, and rotating the cylindrical cutting core relative to the carrier when inserted into the produce. In some embodiments, the method may also include the step of shearing the core from the produce. The step of shearing the core from the produce may include rotating a cutting member connected to the cylindrical cutting core. The method may also include the step of limiting a translational distance the cutting core and the carrier translate. The method may also include the step of ejecting the core from the cylindrical cutting core. The step of rotating the cylindrical cutting core may include rotating a handle extending from the cutting core.

Other objects and advantages of this invention will become apparent from the following description taken in connection with the accompanying drawings, wherein some embodiments of this invention are set forth by way of illustration and examples.

DETAILED DESCRIPTION

Figure 1:
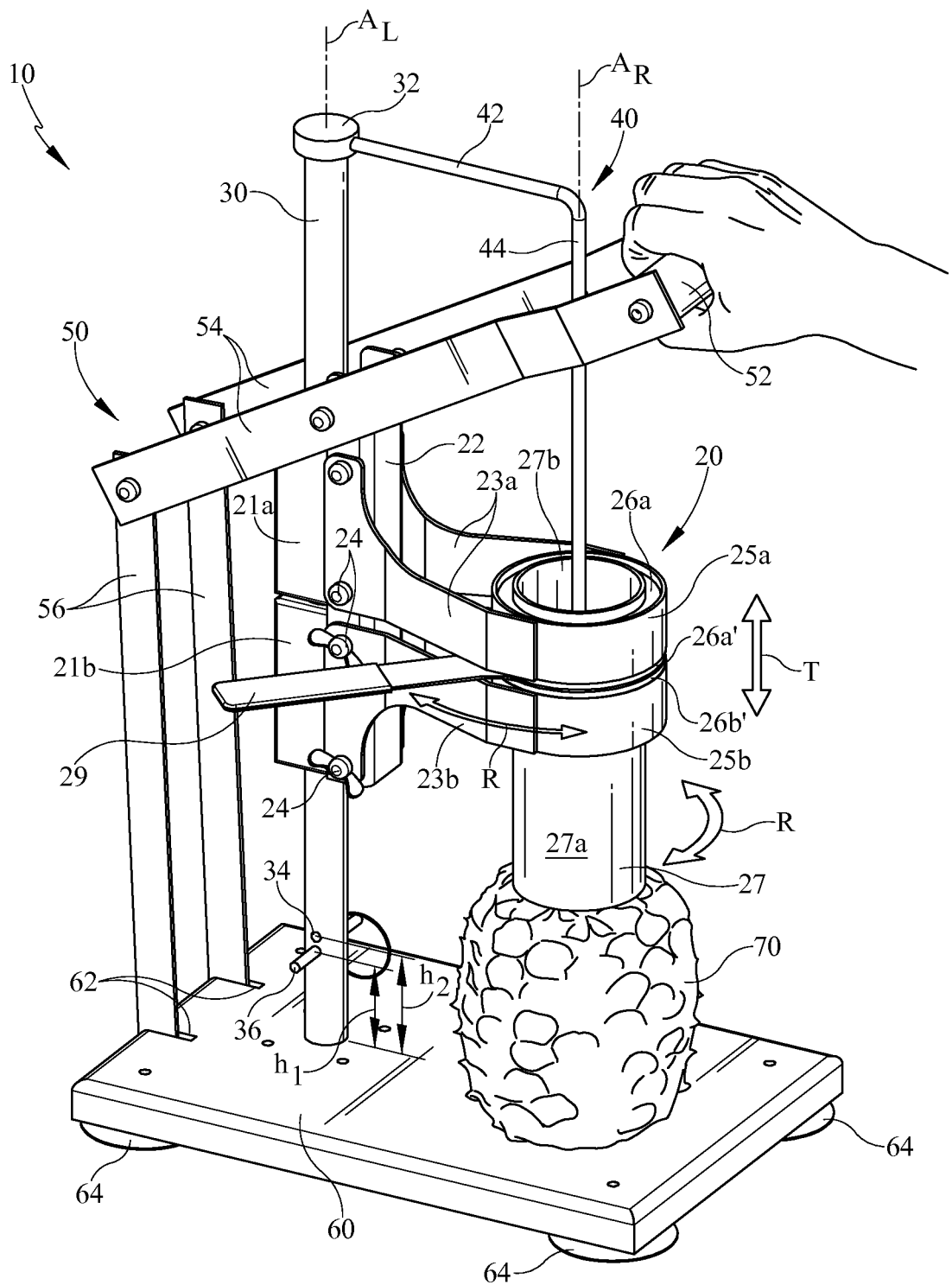
FIG. 1 is a perspective view of an embodiment of a coring apparatus in an upper position.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled,", "attached", "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

As illustrated in FIGS. 1-6, an embodiment of a coring apparatus 10 has a base 60 for supporting fruit 70. Base 60 has connected thereto a cylindrical shaft 30 that extends upwardly from base 60. Shaft 30 provides a stationary guide for a carrier 20 to slideably engage, allowing carrier 20 to slide linearly in a translational direction T. Carrier 20 is translatable in translation direction T between first and second positions and rotatably holds a cylindrical cutting core 27, allowing cylindrical cutting core 27 to rotate about an axis of rotation $A_R$ relative to carrier 20. Thus, cylindrical cutting core 27 can be translated in translational direction T, made to engage fruit 70, and rotated to cut a core 72 out of fruit 70.

Coring apparatus 10 may include any or all of carrier 20, cylindrical cutting core 27, a handle 29, shaft 30, an ejecting member 40, a hand press 50, base 60, and fruit or produce 70. Carrier 20 may be translatable in translation direction T and rotably hold cylindrical cutting core 27 by virtue of a first sleeve 21a, a second sleeve 21b, a sleeve bracket 22, a first arm 23a, a second arm 23b, a plurality of nuts 24, a first bushing 25a, and a second bushing 25b. Hand press 50 is interconnected to carrier 20 and to base 60. Carrier 20 is translationally connected to shaft 30 and receives cylindrical cutting core 27. Shaft 30 is also connected to ejecting member 40 and to base 60. In some embodiments, shaft 30 may be connected, attached, or integral with base 60 in such a way as to prevent rotation and/or translation of shaft 30 relative to base 60, if base 60 is included in coring apparatus 10. Thus, shaft 30 may provide a guide for carrier 20.

First and second sleeves 21a, 21b each include an aperture, although only the second sleeve aperture 21b' can be seen, extending therethrough that is sized and shaped to accept shaft 30 such that sleeves 21a, 21b may slide in a translational direction T along shaft 30. Also, in this embodiment, hand press 50 includes a pair of first press arms 54 and a pair of second press arms 56, and hand press 50 is connected to carrier 20 by a carrier rod 58 that is inserted through first press arms 54 and carrier 20. In some embodiments, it may be desirable to have carrier rod 58 be cylindrical, or near cylindrical, in shape so that it may act as a hinge and/or otherwise not impede rotation of hand press 50 relative to carrier 20. Second press arms 56 are connected to base 60 in base slots 62 in such a way as to allow relatively slight rotation lengthwise within base slots 62, or toward or away from shaft 30, but not in a direction perpendicular thereto, such as transverse across base slots 62. Force may be applied to hand press 50, or more specifically, to a grip 52, to cause translation of carrier rod 58 in translational direction T.

By way of connection to carrier rod 58, translation of carrier 20 may be caused in translation direction T along shaft 30. In this way, as is understood in the art, hand press 50, or a portion thereof, may act as a lever to increase the force applied by cylindrical cutting core 27 on fruit 70 as compared to the force applied to grip 52, or elsewhere on hand press 50.

Figure 4:
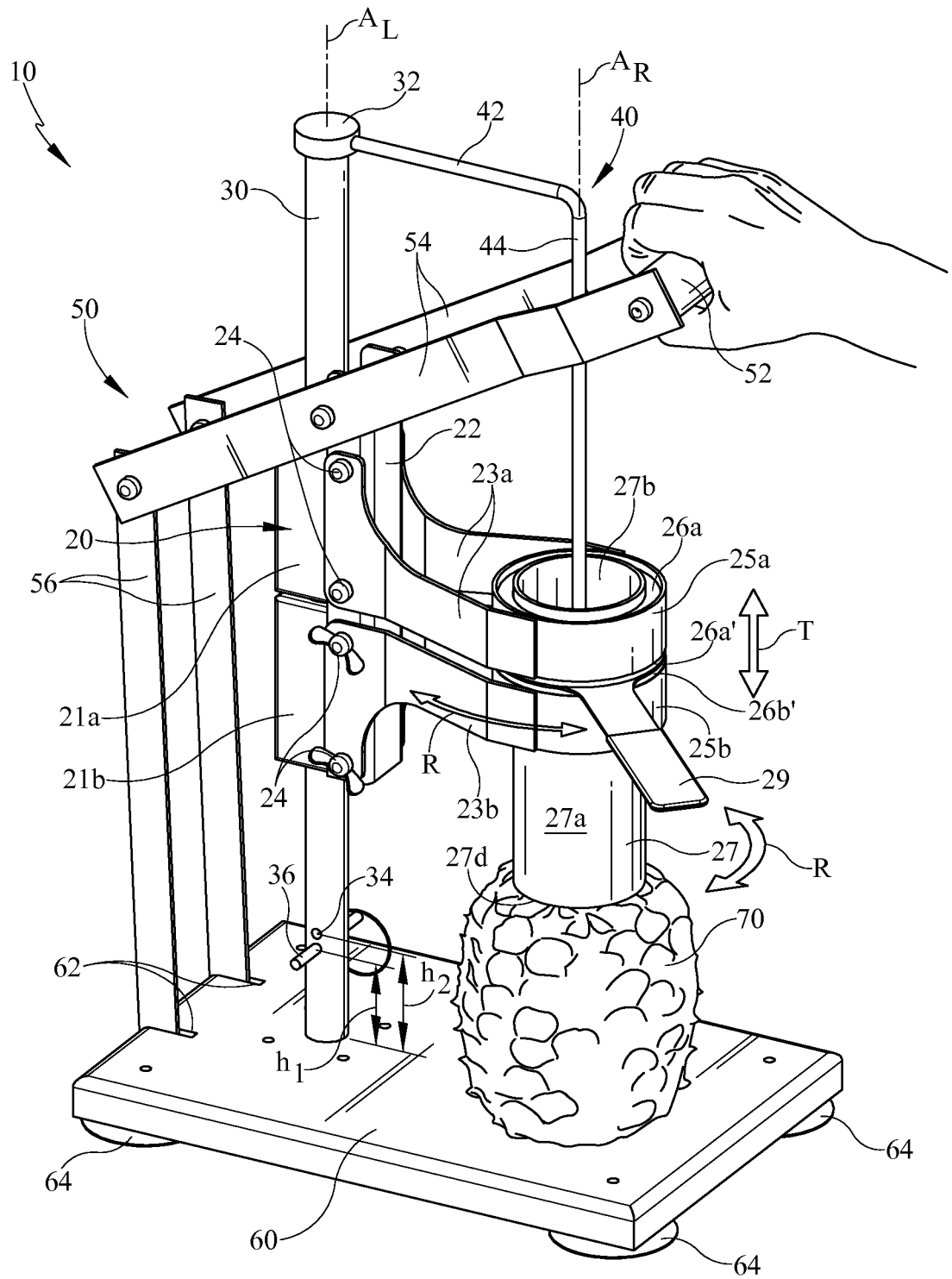
FIG. 4 is a perspective view of an embodiment of a coring apparatus in an upper position with a core partially removed from a piece of produce.
Figure 5:
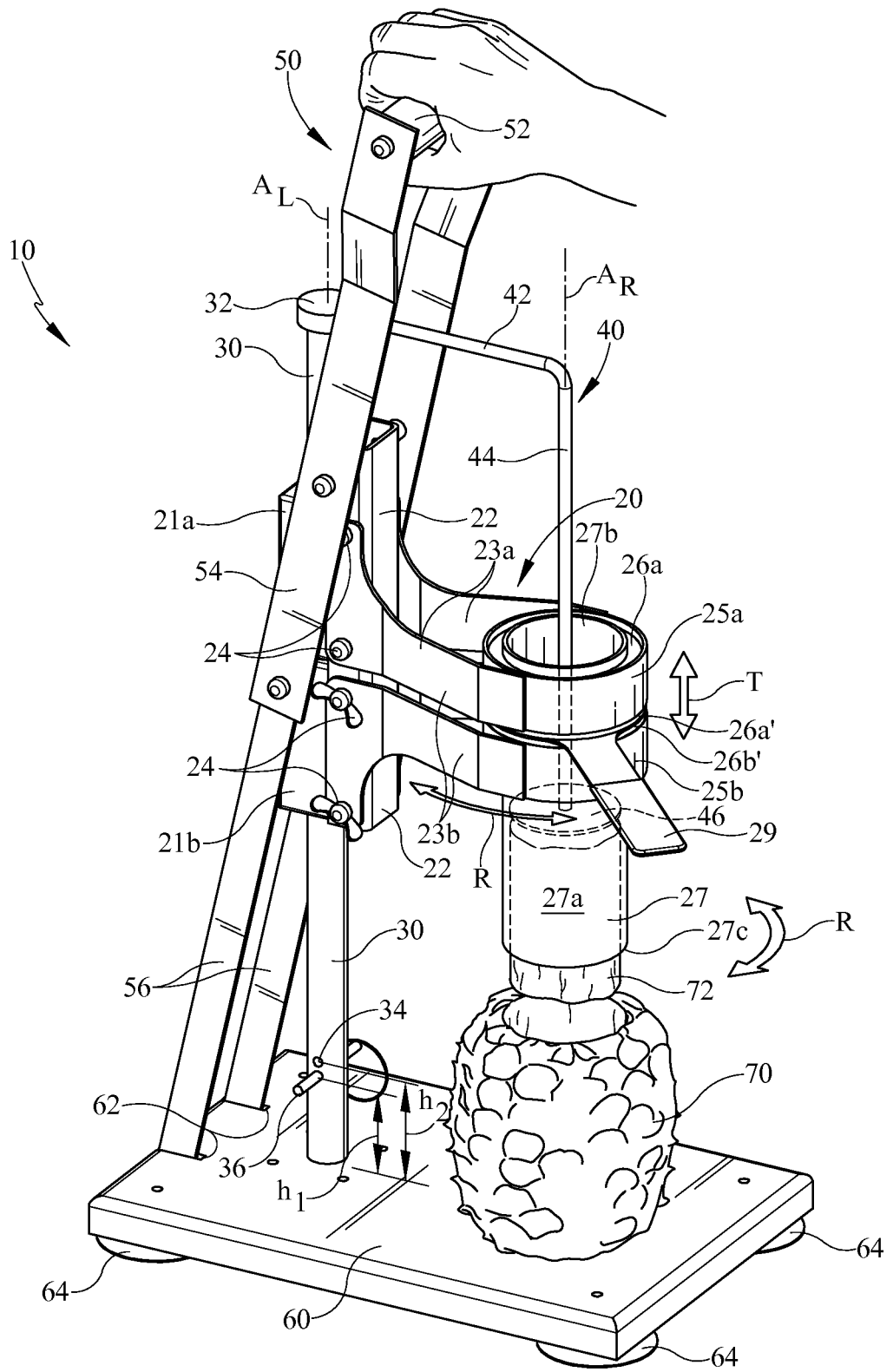
FIG. 5 is a perspective view of an embodiment of a coring apparatus in an ejecting position with a core removed from a piece of produce, and an embodiment of a produce cup.

Referring now to FIGS. 1, 4, and 5, shaft 30 includes a shaft cap 32 at or near the top of shaft 30. Shaft cap 32 may prevent carrier 20 from coming off of shaft 30 and also may connect ejecting member 40 to shaft 30. Shaft 30 includes pin holes 34 that may be located at one or more pin hole heights h1, h2 measured upwardly in translational direction T from base 60. A pin 36 may be inserted into one or both of pin holes 34, thus forming a mechanical stop that may be contacted by carrier 20 preventing carrier 20 from translating beyond pin 36. Thus, pin holes 34 may be used for controlling the cutting depth of cylindrical cutting core 27 within a variety of fruit 70 and as a result controlling the thickness of cup bottom 74. In this way, one or more pin hole heights h1, h2 may be utilized to import vertical adjustability into coring apparatus 10 and allow customization and/or variation of the thickness of cup bottom 74 by varying or altering pin hole heights h1, h2.

Figure 2:
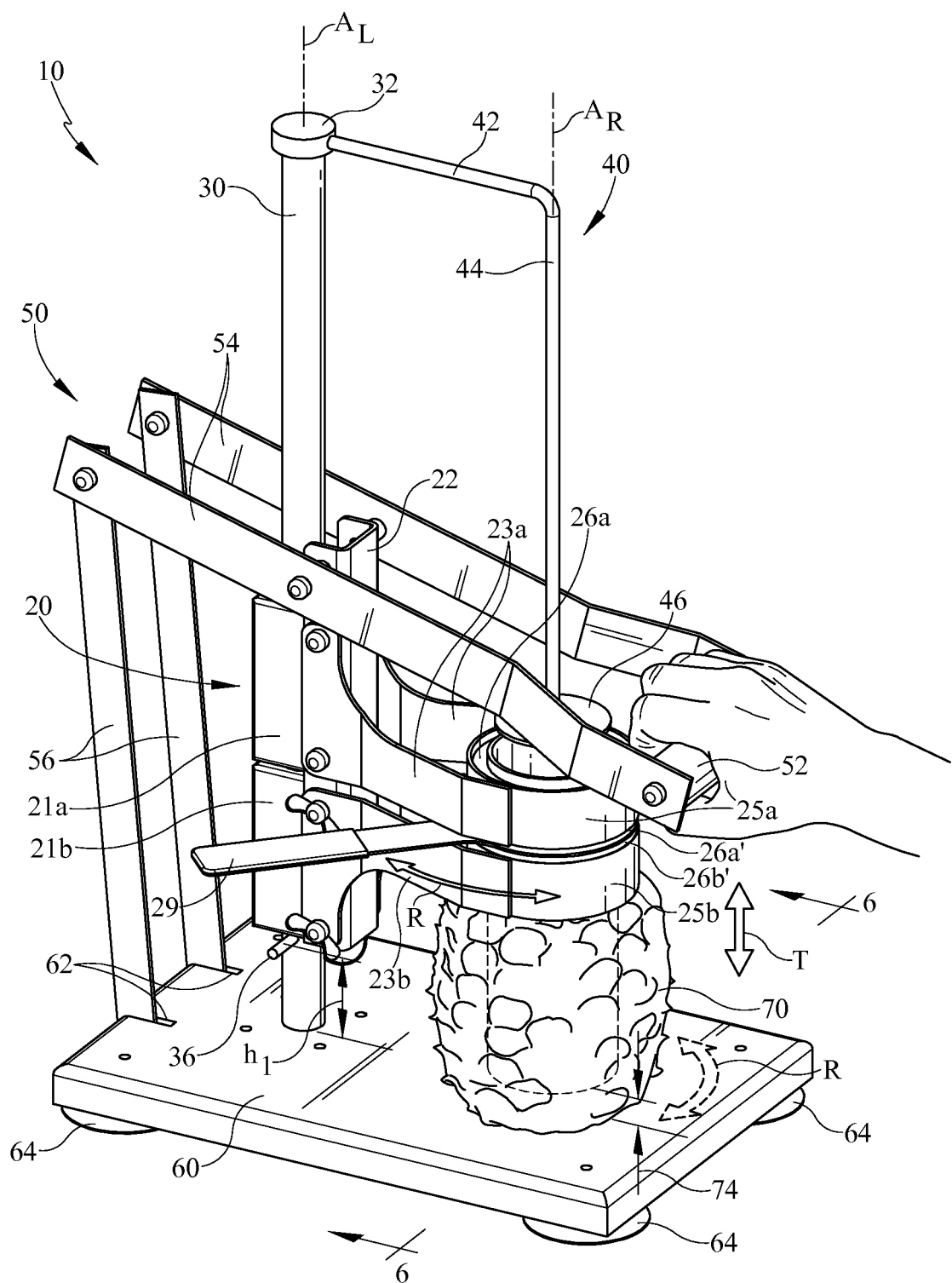
FIG. 2 is a perspective view of an embodiment of a coring apparatus in a lower position.
Figure 3:
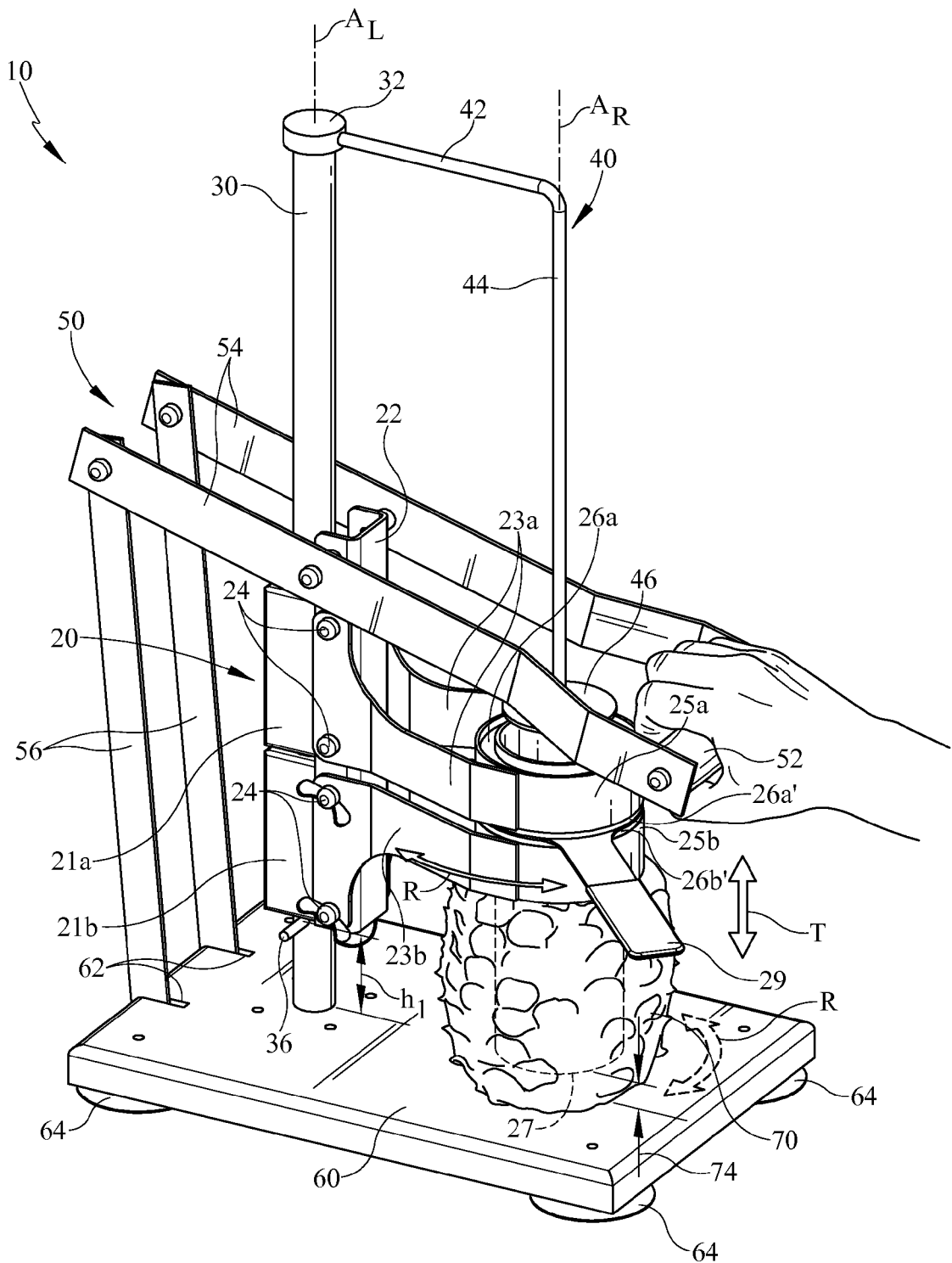
FIG. 3 is a perspective view of an embodiment of a coring apparatus in a lower position with a handle and cylindrical blade rotated relative to the depiction in FIG. 2.
Figure 6:
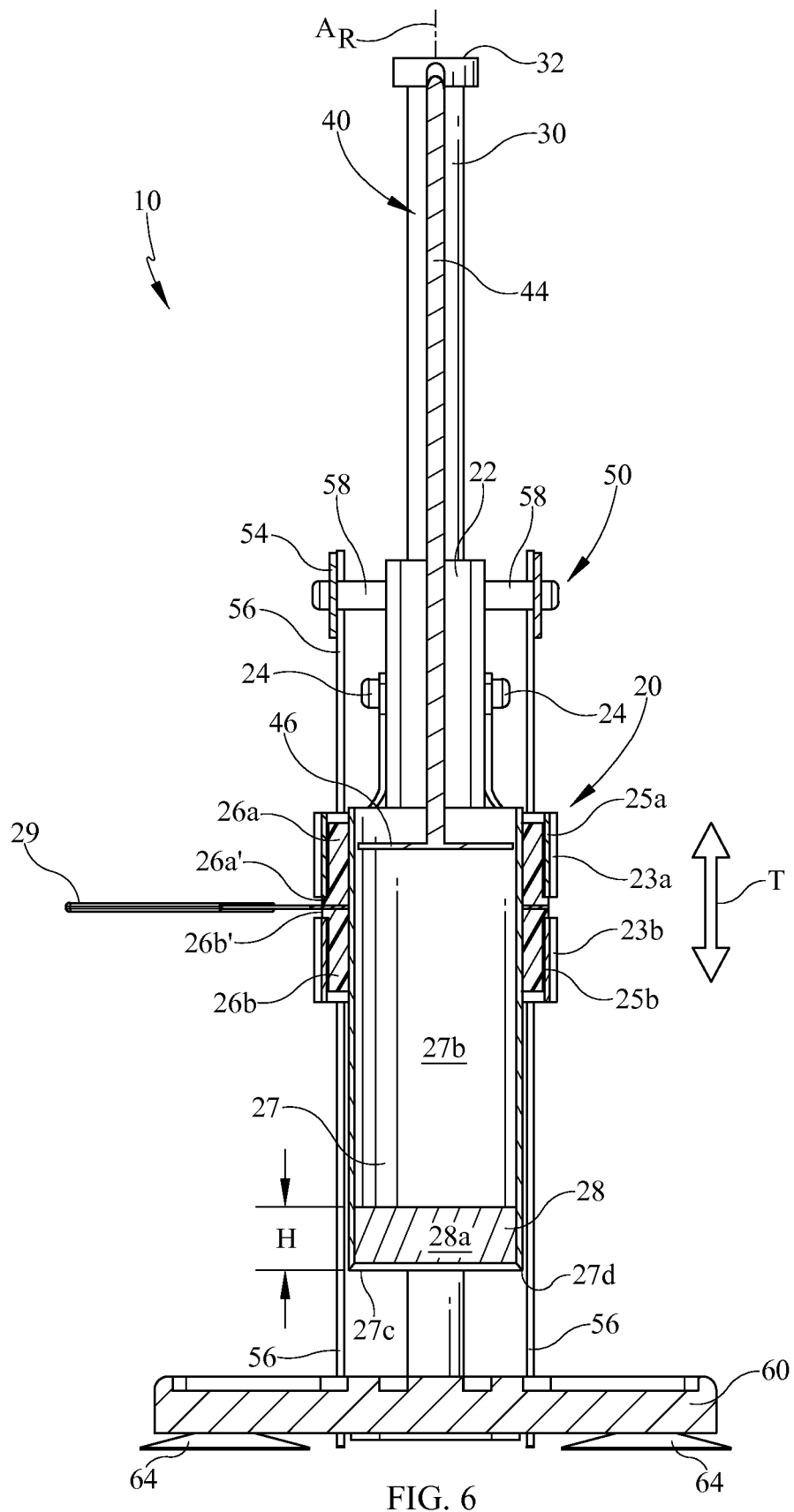
FIG. 6 is a cross-sectional view of the coring apparatus of FIG. 2 taken along line 6-6.
Figure 7:
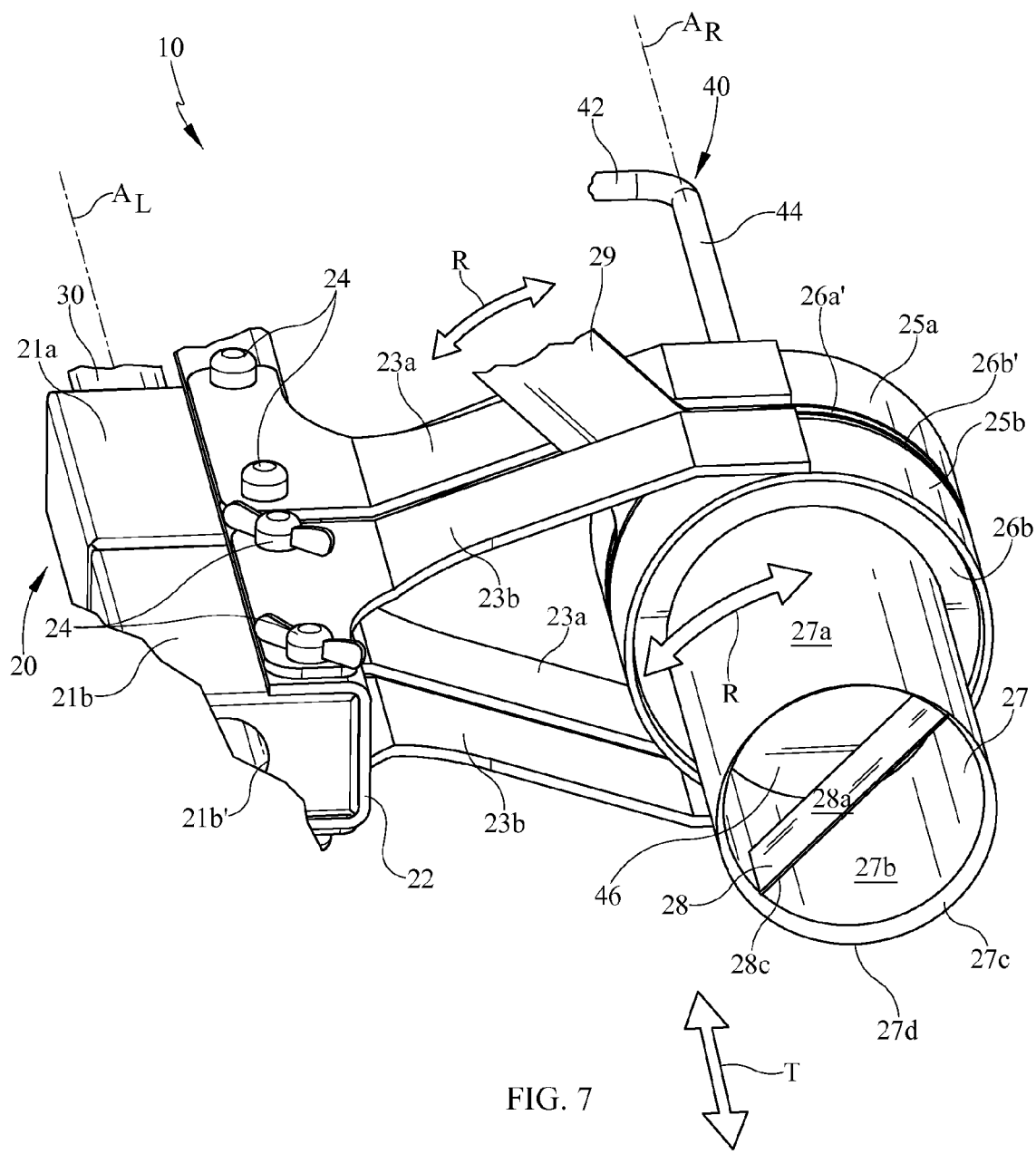
FIG. 7 is an enlarged perspective view of an embodiment of a coring apparatus.

Referring now to FIGS. 1-5, ejecting member 40 includes an outwardly extending arm 42, a downwardly extending arm 44, and an ejecting disk 46. Extending arms 42, 44 provide a structure for holding ejecting disk 46 in a desired location, which, in some embodiments, may be substantially concentric with cylindrical cutting core 27 and/or at a desirable height for ejecting, or partially dislodging, a core 72 from cylindrical core 27. FIGS. 1-4 show coring apparatus 10 in a lower position, as shown in FIGS. 2-3, and an upper position, as shown in FIGS. 1 and 4, either of the lower position and the upper position being a disengaged position in which ejecting member 40 is not penetrating sufficiently deep into cylindrical cutting core 27 to contact the core 72, as intended. FIG. 5 shows coring apparatus 10 in an ejection position, or engaged position, in which the ejecting member 40 is penetrating sufficiently deep into cylindrical cutting core 27 to contact the core 72. Ejection may be desirable after core 72 is removed from fruit 70, as core 72 may tend to stick to cylindrical cutting core 27 when it is inserted into, and/or removed from, fruit 70. As best shown in FIGS. 6 and 7, cylindrical cutting core 27 may have a taper 27d that is tapered or otherwise sharpened at a bottom edge 27c to aid in insertion of the cylindrical cutting core 27 into fruit 70. In some embodiments, ejecting member 40 may be allowed to rotate about longitudinal axis $A_L$ by way of, for example, rotatable affixation of shaft cap 32 to shaft 30 or shaft cap 32 having a slot in which outwardly extending arm 42 can rotate, such that ejecting member 40 may be rotated away from axis of rotation $A_R$ allowing separation of ejecting member 40 from carrier 20 and/or cylindrical cutting core 27. This may allow for easier inspection, cleaning, and/or maintenance of the individual parts of coring apparatus 10 or coring apparatus 10 as a whole. It is understood that a variety of structures or methods may be utilized to allow rotation of ejection member 40 relative to longitudinal axis $A_L$ and such methods are understood in the art. It is further understood that, although it may be preferable to include shaft cap 32, shaft cap 32 is not required.

As illustrated in the Figures, elongated cylindrical cutting core 27 is cylindrical about axis of rotation $A_R$ and has an outside surface 27a and an inside surface 27b. A handle 29 is rigidly affixed and projects radially outwardly from the outside surface 27a. In this way, handle 29 may be moved in a rotational direction R, such as, for example, by hand or otherwise, about axis of rotation $A_R$, which will cause cylindrical cutting core 27 to correspondingly move in rotational direction R, about axis of rotation $A_R$. While handle 29 may rotate most or even all of the way around axis of rotation $A_R$, handle 29 may be effective even if only allowed to rotate a fraction of the way around axis of rotation $A_R$. For example, a quarter turn, or 90 degree turn, may be an effective range of rotation for handle 29. Also, more or less than a 90 degree turn may prove effective. Further, handle 29 may rotate clockwise, counterclockwise, or both about axis of rotation $A_R$. Handle 29 may be adapted for right handed use and/or left handed use, and may be made to easily transition between a right-handed-use position and a left-handed-use position. Axis of rotation $A_R$ is also the longitudinal axis of cylindrical cutting core 27 and, in the embodiment depicted in the Figures, is parallel to longitudinal axis $A_L$. Thus there are two separate and/or distinct longitudinal axes, longitudinal axis $A_L$ and the longitudinal axis of the cylindrical cutting core, which coincides with rotational axis $A_R$. Alternatively, in some embodiments, axis of rotation $A_R$ may be collinear with or skew to longitudinal axis $A_L$.

Although rotation of carrier 20, as shown, is restricted about longitudinal axis $A_L$ as described herein, cylindrical cutting core 27 is rotatably connected to carrier 20 by a first or upper bearing 26a and a second or lower bearing 26b in such a way as to allow movement in rotational direction R of cylindrical cutting core 27 about axis of rotation $A_R$. First and second bearings 26a, 26b are depicted as substantially solid journal bearings that may be made of any of a variety of materials, including, but not limited to, plastic, metal, wood, composite, or any other material or combination of materials, although it may be preferable to use a material having a low coefficient of friction so as to reduce the resistance to the movement of cylindrical cutting core 27 in rotational direction R that may be caused by first and second bearings 26a, 26b within carrier 20. It is understood that first and second bearings 26a, 26b need not be journal bearings and could be any of a variety or quantity, including one, of bearings, including, but not limited to, ball bearings, roller bearings, and/or lubricated bearings; and/or any other device, such as, for example, a friction reducing or negating device. In the embodiment depicted, first bearing 26a has attached, connected, coupled, or integral thereto a first lip 26a' and/or second bearing 26b has attached, connected, coupled, or integral thereto a second lip 26b'. First and second lips 26a', 26b' may extend beyond first and second bushings 25a, 25b, respectively, in translation direction T toward handle 29 to provide a surface for handle 29 to slide on. First and second lips 26a', 26b' include a larger outside diameter than corresponding bearings 26a, 26b and thus will contact the inwardly facing surfaces of each bushing 25a, 25b as well as handle 29. First and second lips 26a', 26b' are separated from each other by a gap through which handle 29 is allowed to rotate. It is understood that the gap need only be present to the extent handle 29 is allowed to rotate about axis of rotation $A_R$. First and second lips 26a', 26b' may be formed of any of a variety of materials, including, but not limited to, plastic, metal, wood, composite, or any other material or combination of materials, although it may be preferable to use a material having a low coefficient of friction so as to reduce the resistance to the movement of handle 29 in rotational direction R. Extension of handle 29 outwardly from cylindrical cutting core 27 in a radial direction substantially perpendicular or transverse to axis of rotation $A_R$ may provide a lever for increasing the force applied in rotational direction R to fruit 70 and/or core 72 by cylindrical cutting core 27 and/or a cutting member 28. While handle 29 is depicted as substantially planar and extending radially outwardly from cylindrical cutting core 27, it is understood that handle 29 may rotate a variety of degrees about axis $A_R$ and may take any of a variety of shapes, configurations, quantities, sizes, and constructions, including but not limited to a rod, a shaft, a curved member, and/or a bent member.

Handle 29 may be attached to cylindrical cutting core 27 in any of a variety of ways, including, but not limited to, welding, bolting, adhering, bonding, partial insertion, and/or any of a variety of other ways. Similarly, first bushing 25a may be attached to first arm 23a in any of a variety of ways, including those just mentioned, or others, and second bushing 25b may be attached to second arm 23b in any of a variety of ways, including those just mentioned, or others. First and/or second arms 23a, 23b may also be attached to sleeve bracket 22 in any of a variety of ways, including those just mentioned, although it may be preferable in some embodiments to use one or more bolts that may be inserted through first and/or second arms 23a, 23b, sleeve bracket 22, and/or sleeves 21a, 21b, substantially as depicted and/or described herein. Bolts, secured by nuts 24, may allow relatively easy removal of first and second arms 23a, 23b, especially if the nuts 24 are wing nuts or other nuts that may be loosened and/or tightened by hand. In some embodiments, it may be desirable that nuts 24 be wing nuts, or similar to wing nuts, especially as located on second arm 23b, to facilitate removal of second arm 23b and/or second bushing 25b from the rest of carrier 20. Such facilitated removal may be desirable as these parts in particular, while in operation, may be exposed to a relatively large amount juices, pulps, and/or other plant or produce components, or the like, from fruit 70 and/or core 72, and thus may call for extra inspection, cleansing, and/or maintenance. Further, different embodiments or styles, such as diameter, of the cylindrical cutting core 27 could be interchanged depending on the desired fruit 70, core 72, or application. For example, cylindrical cutting core 27 having a specific diameter, length, and/or thickness may be removed from the coring apparatus 10 and replaced with a second cutting core 27 having a different diameter, length, and/or thickness. A variety of different cutting cores could thus be provided with the coring apparatus 10, providing a virtually limitless number of cutting core options. These varying cutting cores could be intended for use with varying types of produce and/or for varying sizes within a given type of produce. Cylindrical cutting core 27 may be replaced by, for example, removing first and/or second arms 23*a*, 23*b* from sleeve bracket 22, removing bearings 26*a*, 26*b* from bushings 25*a*, 25*b*, and/or removing cutting core from bearings 26*a*, 26*b*.

Referring now to FIGS. 1-5, a pin 36 is inserted into a pin hole 34 located on shaft 30 to act as a mechanical stop when carrier 20 contacts pin 36. Pin holes 34 may be located to create desired stopping locations of carrier 20 and may thereby limit the depth to which cylindrical cutting core 27 may enter fruit 70. In this way, cutting entirely through fruit 20 may be reliably and consistently prevented, which may reduce the amount of time and effort required to ensure that the operator does not accidentally cut through fruit 20, thus ensuring that a cup bottom 74 remains. Also, in this way, a consistent cut depth into fruit 20, and therefore a consistent thickness of cup bottom 74, may be provided for.

Referring now to FIGS. 6 and 7, an embodiment of cutting member 28 is depicted having a planar or cam surface 28*a*. In some embodiments, cutting member 28 is a substantially planar member or a plate that spans the opening or diameter created by inside surface 27*b* of cylindrical cutting core 27. It is understood, however, that inside and outside surfaces 27*a*, 27*b* need not be cylindrical, and may be any of a variety of other shapes, including, but not limited to, ovular, triangular, rectangular, square, and/or any of a variety of other shapes. In the embodiment depicted, cutting member 28 is disposed at or near a diameter of cylindrical cutting core 27, thus allowing cutting member 28 to substantially bisect core 72 when inserted into fruit 70. Bisecting core 72 into two, or sectioning it into possibly more, pieces may aid in cutting, separating, and/or removing core 72 from the rest of fruit 70. In this embodiment, cutting member 28 has at or near its bottom or free end a cutting edge 28*c* that is tapered and/or sharpened that may facilitate cutting through core 72, although it is understood that cutting edge 28*c* of cutting member 28 need not be tapered or sharpened. Cutting member 28 may be substantially planar, having a height H in the translational direction T. Thus, cutting member 28 has planar surface 28*a* that may act as a cam surface, which, when rotated, as substantially described herein, may aid in separating core 72 from the rest of fruit 70, and specifically from cup bottom 74. As opposed to, or in addition to, merely cutting, cam surface 28*a* may shear and/or angularly displace core 72 from cup bottom 74. Such shearing is often desirable over cutting, as may be the case if cutting member 28 had a substantially smaller height H. The increased surface area of planar surface 28*a* may assist in the overall force distribution applied to core 72. In some embodiments, the combination of bisecting and shearing core 72 may especially aid in the separating and/or removing of core 72 from the rest of fruit 70. Cutting member 28 is shown as a rectangular piece having opposed planar surfaces 28*a*. However, cutting member 28 may be a plate, or a plurality of plates, having opposed planar surfaces 28*a* that are other than rectangular. For example, planar surfaces 28*a* may be circular, semi-circular, round, triangular, square, and/or polygonal, and may or may not be symmetrical. Also, cutting member 28 is shown as a single piece having two opposed planar surfaces 28*a* and bisecting cylindrical core 27 into two symmetrical passages. However, cutting member 28 may include more than one piece or plate, may be located off-center of cylindrical cutting core 27, and may be angled, bent, and/or curved. For example, cutting member 28 may include two pieces or plates that are substantially parallel and trisect, instead of bisecting, cylindrical core 27 into three passages; or cutting member 28 may include X number of pieces extending from inside surface 27*b* and converging at or near axis of rotation $A_R$ to form X pie-shaped passages within cylindrical cutting core 27, or the pieces or plates may extend partially inward and not converge. It is understood that these are merely examples and a variety of pieces or plates, arranged in a variety of orientations, may be used to form cutting member 28 and/or one or more passages within cylindrical cutting core 27.

Referring now to FIGS. 1-6, base 60 is depicted having one or more base feet 64. If included, base feet 64 may be located at each corner of the underside of base 60, as depicted, although it is understood that more or less than four base feet 64 may be included with coring apparatus 10 to interface with a tabletop, countertop, and/or any other surface. Base feet 64 may be included to stabilize base 60, especially during operation of coring apparatus 10, as described herein. It may also be desirable to form base feet 64 of a substantially slip-resistant material, or a material having a relatively high coefficient of friction, such as for example, rubber and/or plastic. It is understood that base 60 and base feet 64 may be made of any of a variety of materials, including, but not limited to, rubber, plastic, wood, metal, composite materials, and/or any other material or combination thereof. Further, in some embodiments, base feet 64 may be suctioned to form suction cups to provide additional stabilization of base 60 relative to an underlying tabletop, countertop, or other surface. It is understood that any of a variety of means of connecting, attaching, and/or stabilizing base 60 with respect to the underlying surface may be utilized, and may include, but are not limited to, suctioning, bolting, screwing, nailing, gluing, adhering, bonding, coupling, and/or otherwise connecting and/or attaching base 60 to an underlying surface. Further, it is understood that coring apparatus 10 may be made to be wall-mountable, such that coring apparatus 10 may be mounted to a wall or similar structure in lieu of, or in addition to, an underlying surface.

Although FIG. 1-7 show coring apparatus 10 in a vertical orientation with translational direction T substantially vertical, it is understood that coring apparatus 10 may be oriented horizontally and may be used in either or both orientations, or any orientation therebetween, including those angled relative to the horizontal and/or vertical.

In use, coring apparatus 10 may be manually or otherwise operated by applying force to hand press 50, for example, by hand-gripping and pushing or pulling on grip 52 of hand press 50 in translation direction T to cause translation of the carrier 20 in translational direction T, as substantially described above or elsewhere herein. It should be understood that particular or partial steps could be automated. In this way, hand press 50 may be used to move carrier 20 and cylindrical cutting core 27 in the translational direction T downward so that cylindrical cutting core 27 cuts or otherwise enters into fruit 70, which is resting on base 60, while increasing the longitudinal force applied by cylindrical cutting core 27 on fruit 70. As shown in the lower position in FIG. 2, downward translation in translation direction T may be halted, or stopped, when carrier 20 contacts pin 36 on shaft 30, thus preventing cylindrical cutting core 27 from cutting through cup bottom 74. At this lower position, while holding the fruit 70 with one hand or device (not shown) the other hand can rotate handle 29 in rotational direction R relative to the carrier 20, either clockwise or counterclockwise, to shear or otherwise cause separation of core 72 from the rest of fruit 70, as shown in FIG. 3. Cutting member 28 acts in concert with cylindrical cutting core 27 to hold most or all of core 72, so that planar surface 28a pushes or cams core 72, relative to the rest of fruit 70, causes shearing or separation of core 72 from the rest of fruit 70 during rotation of handle 29 and cylindrical cutting core 27. Handle 29 and cylindrical cutting core 27 may be rotated back and forth, at a variety of degrees of rotation about axis $A_R$, repeatedly to cause the desired separation. Hand press 50 may be reversed in the opposite direction to move carrier 20 and cylindrical cutting core 27 upwardly in translational direction T to an upper position. One such upper position may be illustrated in FIG. 4, where core 72 is removed, or partially removed, from the rest of fruit 70. If desired, fruit 70 may be removed from base 60. By continuing to move hand press 50 upwardly, the carrier 20 and cylindrical cutting core 27 translate upwardly in translational direction T to the ejection position, as shown in FIG. 5. In the ejection position, ejection member 40 has begun to partially or fully eject core 72 from cylindrical cutting core 27 by way of ejecting disk 46 contacting core 72 and thereby preventing further upward motion of core 72 in translational direction T relative to cylindrical cutting core 27 and carrier 20, which may continue to upwardly translate in translational direction T. Upon removal of the core 72 and the fruit 70 after coring, the process may be repeated.

It is understood that, while FIGS. 1-7 depict a pineapple or similar fruit, the apparatus and methods disclosed are not so limited, and may be used on any of a variety of objects, including, but not limited to, pineapple, apple, coconut, orange, mango, or any other fruit, vegetable, produce, or other object.

It is further understood that while certain forms of the invention have been illustrated and described, it is not limited thereto except insofar as such limitations are included in the following claims and allowable functional equivalents thereof.

I claim:

1. A coring apparatus for a cup shaped produce, comprising:
    a carrier includes a core bearing and is slidingly positionable between an upper position and a lower position in a vertical direction, wherein said core bearing includes a first bearing and a second bearing;
    a cylindrical cutting core having an outer surface between an upper end and a lower end a handle, wherein said handle outwardly projects in a radial direction transverse to said vertical direction directly from said outer surface of said cylindrical cutting core between said upper end and said lower end, wherein said carrier slides both said handle and said cutting core between said upper position and said lower position, and wherein both said cylindrical cutting core and said handle are rotatably connected to said carrier by said core bearing, wherein said first bearing and said second bearing circumscribes said cylindrical cutting core, and said first bearing is disposed on a first side of said handle and said second bearing is disposed on an opposing second side of said handle; and
    wherein said first bearing includes a lower end with a first lip adjacent said first side of said handle and said second bearing includes an upper end with a second lip adjacent said second side of said handle;
    when both said cylindrical cutting core and said handle rotates together relative to said carrier between a first rotational position and a second rotational position at said lower position of said carrier, said first side of said handle slides against said first lip of said first bearing and said second side of said handle slides against said second lip of said second bearing.

2. The coring apparatus of claim 1 wherein a cutting member is interiorly disposed across said cylindrical cutting core.

3. The coring apparatus of claim 2 wherein said cutting member includes a cutting edge.

4. The coring apparatus of claim 2 wherein said cutting member is a plate with opposing planar surfaces perpendicular to the longitudinal axis of said cylindrical cutting core.

5. The coring apparatus of claim 4 wherein said opposing planar surfaces of said cutting member and said inner cylindrical surface of said cylindrical cutting core define at least two passages.

6. A coring apparatus for producing a cup shaped produce, comprising:
    a cutting core having a cylindrical body, a handle, and a cutting plate, wherein said body includes an upper end and a lower end relative to a longitudinal axis, wherein said handle projects radially outwardly and directly from said body between said upper end and said lower end, and wherein said cutting plate transverses said body lower end;
    a carrier having an upper bushing with an upper cylindrical bearing therein and a lower bushing with a lower cylindrical bearing therein, wherein said carrier is positionable between at least an upper position and a lower position along said longitudinal axis while carrying said cutting core between said upper position and said lower position; and
    wherein said upper cylindrical bearing circumscribes said upper end of said body of said cutting core above said handle of said cutting core projecting radially outwardly and directly from said body and said lower cylindrical bearing circumscribes said body below said handle of said cutting core projecting radially outwardly and directly from said body, wherein said upper cylindrical bearing and said lower cylindrical bearing rotatably connects said cutting core to said carrier such that said cutting core with said handle and said cutting plate rotates between a first rotational position and a second rotational position relative to said carrier about said longitudinal axis when said carrier is in said lower position, wherein said handle of said cutting core slides against both a lower end of said upper cylindrical bearing and an upper end of said lower cylindrical bearing when rotating between said first rotational position and said second rotational position.

7. The coring apparatus of claim 6 wherein said handle rotates within a gap between said upper and lower cylindrical bearings thereby axially retaining said handle.

8. The coring apparatus of claim 6 wherein said handle projects radially outwardly from said body in a direction perpendicular to said longitudinal axis.

9. The coring apparatus of claim 6 wherein said cutting plate includes elongated planar surfaces between an upper edge and a lower edge of said cutting plate.

10. The coring apparatus of claim 9 wherein said planar surfaces of said cutting plate are cam surfaces during rotation of said cutting core cutting plate between said first rotational position and said second rotational position.

11. The coring apparatus of claim 6 further comprising an ejecting member wherein said carrier is translatable to a core ejecting position above said upper position and said ejecting member is received within said upper end of said cutting core body when in said core ejecting position to remove the produce core.

12. A coring apparatus for producing a cup shaped produce comprising:
- a base;
- an elongated member projecting from said base;
- a carrier slideably connected to said elongated member, said carrier slides in a vertical direction relative to said base along said elongated member;
- a hand press, wherein at least a portion of said hand press forms a lever for increasing force applied to said carrier in said vertical direction;
- a cylindrical cutting core having a handle radially extending outwardly from said cylindrical cutting core, and a cutting member coupled to and radially extending inwardly from said cylindrical cutting core;
- said cylindrical cutting core with said handle and said cutting member correspondingly moves with said carrier in said vertical direction; and
- at least one cylindrical bearing circumscribing said cylindrical cutting core and positioned between said carrier and said cylindrical cutting core, wherein said at least one cylindrical bearing allows said cylindrical cutting core to rotate relative to said carrier such that said handle rotates said cylindrical cutting core, wherein said handle slides against a lip of said at least one cylindrical bearing during rotation of said handle relative to said carrier, wherein said lip has a larger outer diameter than said at least one cylindrical bearing.

13. The coring apparatus of claim 12 wherein said cutting member has a thickness perpendicular to a longitudinal axis of said cylindrical cutting core, said cutting member has a height parallel to said longitudinal axis that is greater than said thickness.

14. The coring apparatus of claim 12 further comprising an ejection member extending from said elongated member and projecting into said cylindrical cutting core when in an engaged position and projects out of said cylindrical cutting core when in a disengaged position.

15. The coring apparatus of claim 12 wherein said cylindrical cutting core rotates about its longitudinal axis.

16. The coring apparatus of claim 12 wherein said at least one cylindrical bearing directly contacts said handle and said cylindrical cutting core during rotation of said cutting core.

17. The coring apparatus of claim 12 wherein said at least one cylindrical bearing includes an upper bearing and a lower bearing.

18. The coring apparatus of claim 17 wherein a first arm of said carrier includes an upper bushing receiving said upper bearing and a second arm of said carrier includes a lower bushing receiving said lower bearing.

19. The coring apparatus of claim 17 wherein said upper bearing is separated from said lower bearing by a gap, wherein said handle rotates within said gap during rotation of said cutting core.

* * * * *